H. W. PERSING.
Coffee Roaster.
No. 90,386.             Patented May 25, 1869.
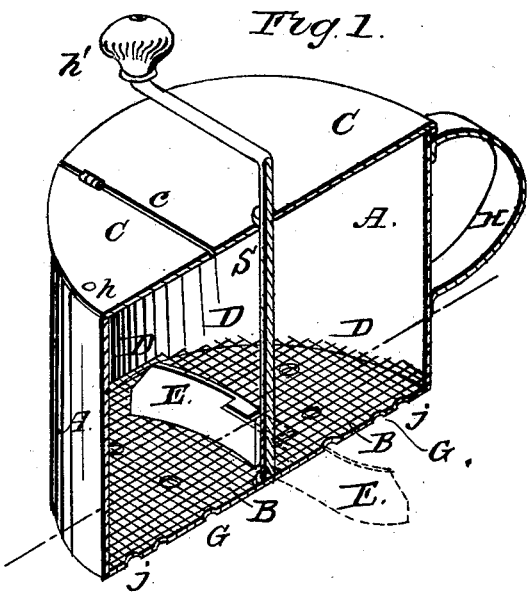
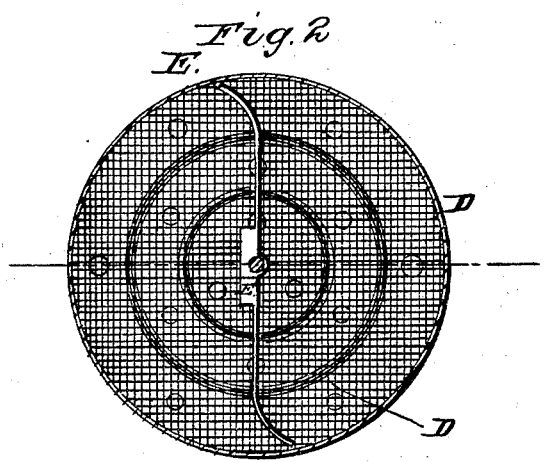 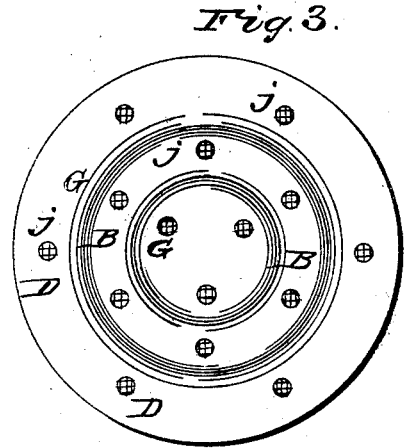

United States Patent Office.

H. W. PERSING, OF CHICAGO, ILLINOIS.

Letters Patent No. 90,386, dated May 25, 1869.

---

IMPROVEMENT IN COFFEE-ROASTERS.

---

The Schedule referred to in these Letters Patent and making part of the same.

---

*To all whom it may concern:*

Be it known that I, H. W. PERSING, of Chicago, in the county of Cook, in the State of Illinois, have invented a new and useful Improvement in Coffee-Roasters; and I do hereby declare that the following is a full, clear, and exact description of the construction and operation of the same, reference being had to the annexed drawings, and to the letters of reference marked thereon, the same making a part of this specification.

Figure 1 is a vertical sectional view of all the parts of the roaster;

Figure 2 is a view of the bottom inside, showing the wire gauze; and

Figure 3 is a view of the outside of the bottom, showing the perforations and corrugations.

Like letters in the figures refer to like parts.

In fig. 1, A A represent a sheet-iron cylinder, of any desired depth and diameter.

B B, in both figures, represent a sheet-iron bottom, corrugated, as shown by G G, and perforated, as shown by $j$.

The perpendicularly-crossed lines D D represent a wire bottom, six by six, or eight by eight mesh, which wire bottom is the full size of, rests upon, and is fastened to the cylinder A A with and by the sheet-iron bottom B B.

E E, arms of the stirrer fastened to the rod S.

C C, cover hinged at $c$.

H, handle of the roaster.

$h$, handle of cover.

$h'$, handle of stirrer-rod.

The nature of my invention consists in the combination of the wire bottom D D with the sheet-iron bottom B B, whether the sheet-iron bottom be corrugated and perforated or not, either or both.

The object of the combination is as follows:

The sheet-iron bottom receives the heat from the fire, while the wire bottom keeps the coffee from coming in contact with the heated sheet-iron bottom, thus allowing the heat to pass more equally under and through the coffee, evenly roasting it, and preventing it from being easily burned.

The corrugations in the sheet-iron bottom increase the space for heat, and thus diminish the liability of burning the coffee.

It is a condition of the process that the coffee be constantly stirred.

The perforations in the sheet-iron bottom serve to let the hull or cuticle of the coffee drop out of the roaster as it becomes separated during the process of roasting.

To roast coffee, put the coffee into the roaster and place it on the stove, over a pretty hot fire, leaving the hinged part of the cover raised at first, so that the moisture can escape; then close tightly. Stir constantly.

It is done when it begins to crack; sometimes sooner.

The time required, with a good hot fire, is from ten to twelve minutes.

A use of this roaster for three months or more has proved this combination a decided and valuable improvement over all other cheap roasters that have been tried.

What I claim, is—

A coffee-roaster having perforated corrugated bottom B B, wire-gauze inner bottom D D, and stirrer E E, arranged and constructed to operate substantially as described.

In testimony that I claim the foregoing, I have hereunto set my hand, this 4th day of January, 1869.

H. W. PERSING.

Witnesses:
  JAMES MUIR,
  C. E. PARKER.